United States Patent
Rajagopalan et al.

(10) Patent No.: US 9,454,494 B2
(45) Date of Patent: Sep. 27, 2016

(54) ENCRYPTING A COMMUNICATION FROM A DEVICE

(71) Applicant: Honeywell International Inc., Morristown, NJ (US)

(72) Inventors: Siva Raj Rajagopalan, Chandler, AZ (US); Jun Ho Huh, Minneapolis, MN (US)

(73) Assignee: Honeywell International Inc., Morris Plains, NJ (US)

( * ) Notice: Subject to any disclaimer, the term of this patent is extended or adjusted under 35 U.S.C. 154(b) by 109 days.

(21) Appl. No.: 14/449,847

(22) Filed: Aug. 1, 2014

(65) Prior Publication Data

US 2016/0036591 A1 Feb. 4, 2016

(51) Int. Cl.
*H04L 9/32* (2006.01)
*G06F 12/14* (2006.01)
*H04L 9/06* (2006.01)

(52) U.S. Cl.
CPC ......... *G06F 12/1408* (2013.01); *H04L 9/0668* (2013.01); *G06F 2212/1052* (2013.01)

(58) Field of Classification Search
None
See application file for complete search history.

(56) References Cited

U.S. PATENT DOCUMENTS

| | | | | |
|---|---|---|---|---|
| 5,426,727 A * | 6/1995 | Sugiura | | G06T 11/20 345/467 |
| 5,592,556 A * | 1/1997 | Schwed | | H04K 1/00 380/274 |
| 6,772,339 B1 * | 8/2004 | Jakobsson | | H04L 9/0841 380/283 |
| 8,515,058 B1 * | 8/2013 | Gentry | | H04L 9/008 380/28 |
| 2001/0014156 A1 * | 8/2001 | Murakami | | H04L 9/083 380/277 |
| 2003/0236657 A1 * | 12/2003 | Ryzl | | G06F 8/20 703/23 |
| 2005/0027678 A1 * | 2/2005 | Aono | | G06F 17/30631 |
| 2006/0143295 A1 * | 6/2006 | Costa-Requena | ... | H04L 63/0428 709/227 |
| 2007/0121935 A1 * | 5/2007 | Joye | | G06F 7/723 380/30 |
| 2007/0297614 A1 * | 12/2007 | Rubin | | H04L 9/06 380/285 |
| 2009/0164802 A1 * | 6/2009 | Labaton | | G06F 21/31 713/189 |
| 2009/0298156 A1 * | 12/2009 | Black | | C12N 9/1229 435/194 |
| 2012/0039463 A1 * | 2/2012 | Gentry | | H04L 9/008 380/28 |
| 2012/0130536 A1 * | 5/2012 | Canter | | G07F 9/026 700/237 |
| 2015/0169467 A1 * | 6/2015 | Chase | | G06F 12/1018 711/216 |

OTHER PUBLICATIONS

Oded Goldreich, et al. "A Hard-Core Predicate for all One-Way Functions." Symposium on Theory of Computing, 1989, pp. 25-32.

* cited by examiner

*Primary Examiner* — Dede Zecher
*Assistant Examiner* — Richard McCoy
(74) *Attorney, Agent, or Firm* — Brooks, Cameron & Huebsch, PLLC

(57) ABSTRACT

Methods, devices, and systems for encrypting a communication from a device are described herein. One device includes a memory, and a processor configured to execute executable instructions stored in the memory to generate a subset-sum problem and a Goldreich-Levin hash function and encrypt a communication from the device using the subset-sum problem and the Goldreich-Levin hash function.

16 Claims, 2 Drawing Sheets

330 ⟶

$$\begin{bmatrix} y_1 \\ y_2 \\ \vdots \\ y_N \end{bmatrix} = \begin{bmatrix} M_{11} & M_{12} & \cdots & M_{1N} \\ M_{21} & M_{22} & \cdots & M_{2N} \\ \vdots & \vdots & \ddots & \vdots \\ M_{N1} & M_{N2} & \cdots & M_{NN} \end{bmatrix} \bullet \begin{bmatrix} x_1 \\ x_2 \\ \vdots \\ x_N \end{bmatrix} = \begin{bmatrix} M_{11}x_1 + M_{12}x_2 + \cdots + M_{1N}x_N \\ M_{21}x_1 + M_{22}x_2 + \cdots + M_{2N}x_N \\ \vdots \\ M_{N1}x_1 + M_{N2}x_2 + \cdots + M_{NN}x_N \end{bmatrix}$$

$$\begin{bmatrix} z_1 \\ z_2 \\ \vdots \\ z_K \end{bmatrix} = \begin{bmatrix} H_{11} & H_{12} & \cdots & H_{1K} \\ H_{21} & H_{22} & \cdots & H_{2K} \\ \vdots & \vdots & \ddots & \vdots \\ H_{N1} & H_{N2} & \cdots & H_{NK} \end{bmatrix} \bullet \begin{bmatrix} x_1 \\ x_2 \\ \vdots \\ x_N \end{bmatrix} = \begin{bmatrix} H_{11}x_1 + H_{12}x_2 + \cdots + H_{1K}x_K \\ H_{21}x_1 + H_{22}x_2 + \cdots + H_{2K}x_K \\ \vdots \\ H_{N1}x_1 + H_{N2}x_2 + \cdots + H_{NK}x_K \end{bmatrix}$$

*Fig. 3B*

ENCRYPTING A COMMUNICATION FROM A DEVICE

TECHNICAL FIELD

The present disclosure relates to methods, devices, and systems for encrypting a communication from a device.

BACKGROUND

Many types of devices, such as, for instance, embedded devices (e.g., home security panels) may need to communicate (e.g., send and/or receive communications) over wireless or other types of networks. Such communications can be secured using encryption (e.g., by encrypting the communication).

Previous encryption approaches (e.g., algorithms), however, may use large amounts of memory and/or processing resources, which embedded devices may not have. That is, embedded devices may not have enough memory and/or processing resources to run previous encryption approaches. For instance, previous encryption approaches may use thousands of bytes of memory, while embedded devices may only have hundreds, or even tens, of bytes of memory available.

BRIEF DESCRIPTION OF THE DRAWINGS

FIG. 3A illustrates an example of a data structure for a multiplication operation of a matrix by a vector in accordance with one or more embodiments of the present disclosure.

FIG. 3B illustrates an additional example of a data structure for a multiplication operation of a matrix by a vector in accordance with one or more embodiments of the present disclosure.

DETAILED DESCRIPTION

Figure 1:
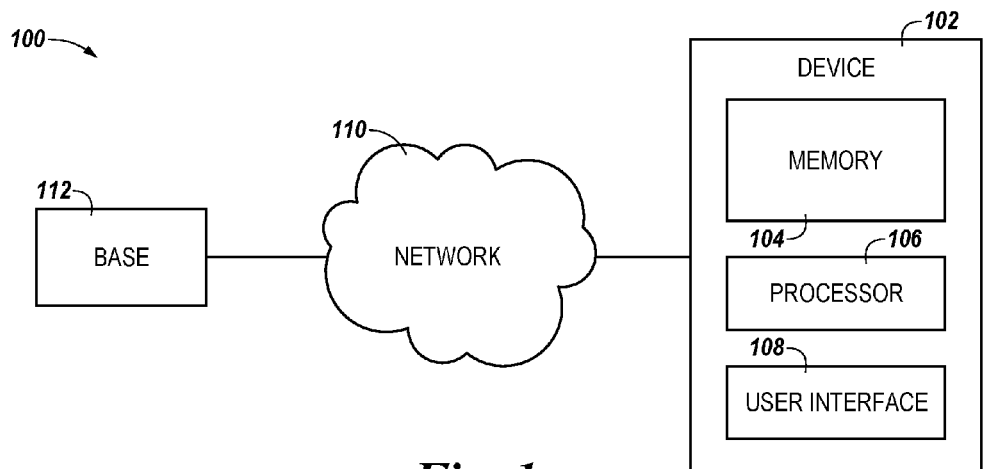
FIG. 1 illustrates an example of a system for encrypting a communication from a device in accordance with one or more embodiments of the present disclosure.

Methods, devices, and systems for encrypting a communication from a device are described herein. For example, one or more embodiments include a memory and a processor configured to execute executable instructions stored in the memory to generate a subset-sum problem and a Goldreich-Levin hash function and encrypt a communication from the device using the subset-sum problem and the Goldreich-Levin hash function.

Encryption approaches in accordance with the present disclosure can use less memory and/or processing resources than previous encryption approaches. For example, encryption approaches in accordance with the present disclosure may use only hundreds, or even tens, of bytes of memory. Accordingly, an embedded device, which may have only hundreds, or even tens, of bytes of memory available, may encrypt its communications using encryption approaches in accordance with the present disclosure.

Further, encryption approaches in accordance with the present disclosure can adequately secure the communications of an embedded device. That is, encryption approaches in accordance with the present disclosure can use less memory and/or processing resources than previous approaches without sacrificing the appropriate level of security for communications from embedded devices.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of devices" can refer to one or more devices.

FIG. 1 illustrates an example of a system 100 for encrypting a communication from a device (e.g., device 102) in accordance with one or more embodiments of the present disclosure. Device 102 can be, for example, an embedded device, such as a home security panel (e.g., touchpad). However, embodiments of the present disclosure are not limited to a particular type of device.

As shown in FIG. 1, system 100 can include a base 112. Base 112 can be, for example, a base (e.g., a control and/or response center) for a home security company. Base 112 may include a number of operators for the home security company, and/or a number of computing devices such as, for example, laptop computers, desktop computers, and/or mobile devices (smart phones, tablets, etc.), among other types of computing devices.

Device 102 and base 112 (e.g., the computing device(s) of base 112) can be coupled (e.g., communicate) via a network 110, as illustrated in FIG. 1 and will be further described herein. Network 110 can be a wired or wireless network, such as, for instance, a wide area network (WAN) such as the Internet, a local area network (LAN), a personal area network (PAN), a campus area network (CAN), or metropolitan area network (MAN), among other types of networks.

As used herein, a "network" (e.g., network 110) can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, network 110 can tie a number of computing devices together to form a distributed control network.

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

As shown in FIG. 1, device 102 includes a memory 104 and a processor 106. Memory 104 can be any type of storage medium that can be accessed by processor 102 to perform various examples of the present disclosure. For example, memory 104 can be a non-transitory computer readable medium having computer readable instructions (e.g., computer program instructions) stored thereon that are executable by processor 106 to encrypt a communication from device 102 in accordance with the present disclosure. That is, processor 106 can execute the executable instructions stored in memory 104 to encrypt a communication from device 102 in accordance with the present disclosure.

Memory 104 can include volatile and/or nonvolatile memory. Memory 104 can also include removable (e.g., portable) memory, and/or non-removable (e.g., internal) memory. For example, memory 104 can include random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

As an example, in some embodiments, memory 104 can include both RAM and non-RAM (e.g., flash and/or ROM) memory. Further, memory 104 may be small (e.g., may only be able to store hundreds, or even tens, of bytes of data). For instance, the RAM of memory 104 may only be able to store less than 100 (e.g., tens) of bytes of data.

In some embodiments, device 102 can encrypt a communication from (e.g., a communication being sent or to be sent by) device 102, such as, for instance, a communication from device 102 to base 112. For example, device 102 can generate a subset-sum problem and a Goldreich-Levin hash function (e.g., extractor), and encrypt the communication from the device using the subset-sum problem and the Goldreich-Levin hash function. For instance, device 102 can input the output (e.g., solution) of the subset-sum problem into the Goldreich-Levin hash function, the Goldreich-Levin hash function can scramble (e.g., compress) the output of the subset-sum problem, and device 102 can then encrypt the communication using the output of the Goldreich-Levin hash function (e.g., using the scrambled output of the subset-sum problem).

Generating the subset-sum problem may include, for example, generating an N by N bit matrix M, wherein x and y are N bit vectors and y=M·x (wherein "·" represents a bitwise multiplication operation of a matrix by a vector). An example of a data structure 330 for such an operation is illustrated in FIG. 3A. Further, generating the subset-sum problem may include generating an N bit vector repeatedly, wherein y1, y2, y3, . . . are B bit vectors, y1 is a random initial N bit vector, M is a random and fixed N by N bit matrix, and y2=M*y1, y3=M*y2, etc., such that the sequence y2, y3, . . . of N bit vectors is generated until a new y1 is received as input (e.g., until y1 is reset).

Matrix M may be stored in the non-RAM memory of memory 104, and vectors x and y may be stored in the RAM of memory 104. Further, N may be proportional to (e.g., depend on) the amount of data (e.g., number of bits) stored in the non-RAM memory of memory 104, and as such the amount of security provided by the encryption may exponentially proportional to N. As an example, N may be 64, in which case matrix M may include 64 rows of 64 bits each, 512 bytes of data in total. As an additional example, N may be 32, in which case matrix M may include 32 rows of 32 bits (or 4 bytes) each (e.g., 128 bytes of data in all). However, embodiments of the present disclosure are not limited to these examples.

In some embodiments, matrix M may be randomly generated by device 102 (e.g., matrix M may be random). For example, device 102 can randomly generate matrix M using a public random source. However, in some embodiments, matrix M may be fixed.

Vector x may be randomly generated by base 112 (e.g., by the computing device(s) of base 112) at an initial power up (e.g., an initial power cycle) of base 112. For example, base 112 can randomly generate vector x using a random number generator, and then process the output of the random number generator using a mixing function to protect against the possibility of the random number generator being flawed (e.g., to ensure that all the bits of vector x are uniformly random). The randomly generated vector x can then be communicated (e.g., sent) to device 102 from base 112 via network 110 (e.g., device 102 can receive vector x from base 112 via network 110). In some embodiments, vector x can be subsequently updated by base 112, as will be further described herein.

Generating the Goldreich-Levin hash function may include, for example, generating an N by K bit matrix H, wherein z=H·x. That is, matrix H can represent the Goldreich-Levin hash function, into which the output of the subset-sum problem (e.g., x) can be input in order to scramble (e.g., compress) the output of the subset-sum problem, and z can be the resulting output of the Goldreich-Levin hash function (e.g., the scrambled output of the subset-sum problem). An example of a data structure 332 for such an operation is illustrated in FIG. 3B. Further, generating the Goldreich-Levin hash function may include repeatedly generating output bits for encryption using the sequence y2, y3, . . . generated in the subset sum problem, wherein z2=H*y2, z3=H*y3, etc., such that a sequence z2, z3, . . . of K bit vectors is generated.

Matrix H may be stored in the non-RAM memory of memory 104 (e.g., along with matrix M), because the security to be provided by the encryption may hold even if matrices H and/or M can be decoded. Matrix H may be randomly generated by device 102, or matrix H may be fixed, in a manner analogous to matrix M.

Further, K may be proportional to the amount of data included in z. That is, K may be proportional to the amount of data output by the Goldreich-Levin hash function. Further, K may be adjusted to reduce the amount of data output by the Goldreich-Levin hash function, which can trade memory for processing cycles by processor 106.

Device 102 can encrypt the communication using the output z of the Goldreich-Levin hash function. Using the Goldreich-Levin hash function can alleviate the risk of lattice attacks that may be able to decode vector x bit by bit, as matrix H and output z reveal no information about vector x. The encryption can be for example, a bit-wise AND, XOR, and/or logical shift.

In some embodiments, vector x can be updated by base 112. For example, base 112 can generate an updated vector x periodically (e.g., every five minutes), upon a decryption failure at base 112, and/or upon a new power up (e.g., a new power cycle) of base 112. The updated vector x can then be communicated (e.g., sent) to device 102 from base 112 via network 110 (e.g., device 102 can receive vector x from base 112 via network 110). Device 102 can generate an updated subset-sum problem (e.g., an updated matrix M) and an updated Goldreich-Levin hash function (e.g., an updated matrix H) based on the updated vector x, and encrypt an additional communication from device 102 using an updated output of the Goldreich-Levin hash function (e.g., an updated z) that is based on the updated Goldreich-Levin hash function and the updated vector x.

As shown in FIG. 1, device 102 includes a user interface 108. A user of device 102 can interact with the device via user interface 108. For example, user interface 108 can provide (e.g., display and/or present) information (e.g., data) to the user, and/or receive information (e.g., input) from the user. For instance, user interface 108 can be a graphical user interface (GUI) that can include a display (e.g., a screen) that can provide and/or receive information to and/or from the user. The display can be, for instance, a touch-screen (e.g., the GUI can include touch-screen capabilities). As an additional example, user interface 108 can include a number of buttons and/or switches that can be pressed and/or flipped by the user. Embodiments of the present disclosure, however, are not limited to a particular type(s) of user interface.

Figure 2:
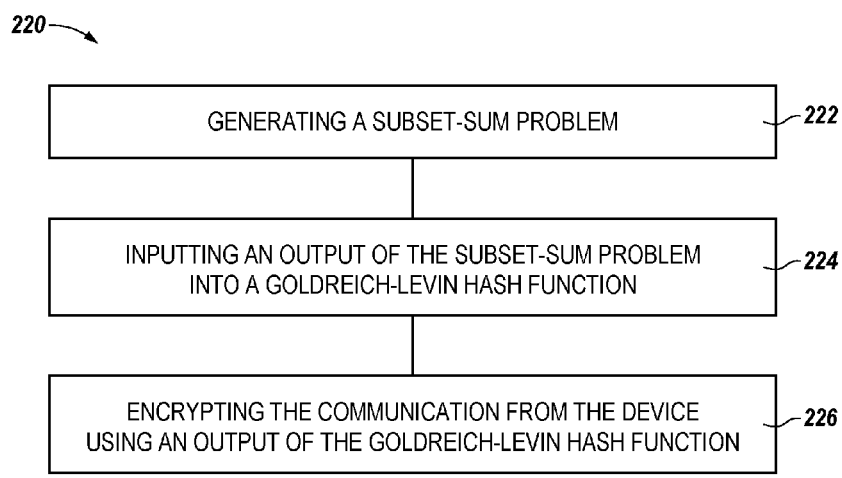
FIG. 2 illustrates an example of a method for encrypting a communication from a device in accordance with one or more embodiments of the present disclosure.

FIG. 2 illustrates an example of a method 220 for encrypting a communication from a device in accordance with one or more embodiments of the present disclosure. Method 220 can be performed by (e.g., the device can be), for example, device 102 previously described in connection with FIG. 1.

At block 222, method 220 includes generating a subset-sum problem. The subset-sum problem can be generated in a manner analogous to that previously described herein (e.g., in connection with FIG. 1). For example, the subset-sum problem can be generated by generating an N by N bit matrix M, wherein x and y are N bit vectors and y=M•x, as previously described herein.

At block 224, method 220 includes inputting an output of the subset-sum problem into a Goldreich-Levin hash function. For example, the output of the subset-sum problem can be input into an N by K bit matrix H that represents the Goldreich-Levin hash function, wherein z=H•x, in order to scramble (e.g., compress) the output of the subset-sum problem, as previously described herein.

At block 226, method 220 includes encrypting the communication from the device using an output of the Goldreich-Levin hash function. That is, the communication can be encrypted using the scrambled output of the subset-sum problem (e.g., z), as previously described herein.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An embedded device, comprising:
    a memory; and
    a microprocessor configured to execute executable instructions stored in less than a thousand bytes of the memory to:
        generate a subset-sum problem and a Goldreich-Levin hash function, wherein:
            generating the subset-sum problem includes generating an N by N bit matrix M, wherein x and y are N bit vectors and y=M·x; and
            generating the Goldreich-Levin hash function includes generating an N by K bit matrix H, wherein z=H·x;
        encrypt a communication from the embedded device using z;
        receive an updated vector x;
        generate an updated matrix M based on the updated vector x;
        generate an updated matrix H based on the updated vector x; and
        encrypt an additional communication from the embedded device using an updated z, wherein the updated z is based on the updated matrix H and the updated vector x.

2. The embedded device of claim 1, wherein:
    the memory includes random access memory (RAM) and non-RAM memory;
    the matrix M is stored in the non-RAM memory; and
    the vectors x and y are stored in the RAM.

3. The embedded device of claim 1, wherein:
    the memory includes non-random access memory (non-RAM) memory; and
    N is proportional to an amount of data stored in the non-RAM memory.

4. The embedded device of claim 1, wherein z is an output of the Goldreich-Levin hash function.

5. The embedded device of claim 1, wherein:
    the memory includes random access memory (RAM) and non-RAM memory;
    the matrix H is stored in the non-RAM memory; and
    the vectors x and y are stored in the RAM.

6. The embedded device of claim 1, wherein the memory includes random access memory (RAM) configured to store less than 100 bytes of data.

7. The embedded device of claim 1, wherein the embedded device is a home security panel.

8. A computer implemented method for encrypting a communication sent by an embedded device, comprising:
    generating a subset-sum problem, wherein generating the subset-sum problem includes generating an N by N bit matrix M, wherein x and y are N bit vectors and y=M·x;
    inputting an output of the subset-sum problem into a Goldreich-Levin hash function wherein the Goldreich-Levin hash function is represented by an N by K bit matrix H, and wherein z=H·x;
    and encrypting the communication from the embedded device using z;

receiving an updated vector x;
generating an updated matrix M based on the updated vector x;
generating an updated matrix H based on the updated vector x; and
encrypting an additional communication from the embedded device using an updated z, wherein the updated z is based on the updated matrix H and the updated vector x;
and wherein the method is executed by executable instructions stored in less than a thousand bytes of memory comprised in the embedded device.

9. The method of claim 8, wherein the method includes scrambling, by the Goldreich-Levin hash function, the output of the subset-sum problem.

10. A non-transitory computer readable medium having computer readable instructions stored thereon that are executable by a microprocessor to:
generate an N by N bit matrix M, wherein:
x and y are N bit vectors; and $$y = M \cdot x;$$

generate an N by K bit matrix H, wherein $z = H \cdot x$;
and encrypt a communication from an embedded device using z;
receive an updated vector x;
generate an updated matrix M based on the updated vector x;
generate an updated matrix H based on the updated vector x;
and encrypt an additional communication from the embedded device using an updated z,
wherein the updated z is based on the updated matrix H and the updated vector x,
wherein the instructions are stored in less than a thousand bytes of the computer readable medium.

11. The computer readable medium of claim 10, wherein K is proportional to an amount of data included in z.

12. The computer readable medium of claim 10, wherein the instructions are executable by the microprocessor to randomly generate the matrices M and H.

13. The computer readable medium of claim 10, wherein the matrices M and H are fixed.

14. The computer readable medium of claim 10, wherein the vector x is randomly generated.

15. The computer readable medium of claim 14, wherein the vector x is randomly generated by processing, by a mixing function, an output of a random number generator.

16. The computer readable medium of claim 10, wherein the instructions are executable by the microprocessor to receive the vector x.

* * * * *